(12) United States Patent
Keller et al.

(10) Patent No.: US 9,406,205 B2
(45) Date of Patent: Aug. 2, 2016

(54) METHOD AND APPARATUS FOR ACTIVATING AND CONTROLLING FIRE AND MASS NOTIFICATION VISUAL DEVICES

(76) Inventors: Joseph Rudy Keller, Red Bank, NJ (US); Joseph Kosich, South Toms River, NJ (US); David John Salgueiro, Cranford, NJ (US)

(*) Notice: Subject to any disclaimer, the term of this patent is extended or adjusted under 35 U.S.C. 154(b) by 118 days.

(21) Appl. No.: 13/358,830

(22) Filed: Jan. 26, 2012

(65) Prior Publication Data

US 2013/0194063 A1 Aug. 1, 2013

(51) Int. Cl.
G08B 5/22 (2006.01)
G08B 7/06 (2006.01)
G08B 5/38 (2006.01)
H04J 3/06 (2006.01)

(52) U.S. Cl.
CPC .. *G08B 5/22* (2013.01); *G08B 5/38* (2013.01); *G08B 7/06* (2013.01); *H04J 3/0605* (2013.01); *H04J 3/0638* (2013.01)

(58) Field of Classification Search
CPC . G08B 7/06; G08B 25/04–25/06; G08B 3/10; G08B 26/001; G08B 7/062; G08B 7/064; G08B 5/22; G08B 5/38; H04J 3/0605; H04J 3/0638
USPC ............... 340/577, 584, 628, 691.1–693.12, 340/815.4–815.92
See application file for complete search history.

(56) References Cited

U.S. PATENT DOCUMENTS

| | | | |
|---|---|---|---|
| 6,281,789 B1* | 8/2001 | Furtado et al. | 340/506 |
| 6,426,697 B1 | 7/2002 | Capowski et al. | |
| 2003/0080865 A1* | 5/2003 | Capowski et al. | 340/506 |
| 2004/0140891 A1* | 7/2004 | Capowski et al. | 340/506 |
| 2006/0158548 A1* | 7/2006 | Broemmelsiek | 348/373 |
| 2007/0035407 A1* | 2/2007 | Capowski et al. | 340/679 |
| 2008/0180229 A1* | 7/2008 | Piccolo, III et al. | 340/332 |
| 2008/0266064 A1* | 10/2008 | Curran et al. | 340/293 |
| 2009/0072989 A1* | 3/2009 | Rock et al. | 340/691.1 |
| 2009/0091466 A1* | 4/2009 | Sendrowski, Jr. | 340/691.1 |
| 2009/0174566 A1* | 7/2009 | Volk et al. | 340/691.5 |
| 2009/0322526 A1* | 12/2009 | Lontka | 340/540 |
| 2010/0327766 A1* | 12/2010 | Recker et al. | 315/291 |
| 2011/0043367 A1* | 2/2011 | Becker et al. | 340/577 |
| 2011/0133655 A1* | 6/2011 | Recker et al. | 315/159 |
| 2012/0154160 A1* | 6/2012 | Piccolo, III | 340/628 |
| 2013/0027198 A1* | 1/2013 | Piccolo, III | 340/506 |

OTHER PUBLICATIONS

PCT Search Report for Application No. PCT/US13/23297. Mailed Apr. 19 2013. Consists of 9 unnumbered pages.

* cited by examiner

*Primary Examiner* — Hai Phan
*Assistant Examiner* — Orlando Bousono

(57) ABSTRACT

One embodiment of a method for activating a stimulus on a notification device includes encoding an instruction to activate the stimulus in a voltage dropout pulse of a synchronization protocol and sending the synchronization protocol, including the voltage dropout pulse, over a single two wire circuit to which a fire notification device and a mass notification device are coupled, where the notification device is the fire notification device or the mass notification device.

20 Claims, 4 Drawing Sheets

METHOD AND APPARATUS FOR ACTIVATING AND CONTROLLING FIRE AND MASS NOTIFICATION VISUAL DEVICES

BACKGROUND OF THE DISCLOSURE

Fire notification and mass notification visual devices use visible stimuli to alert nearby individuals of emergency situations such as fires, weather-related emergencies (e.g., tornados, floods, and the like), chemical accidents, and criminal activities (e.g., shootings, bomb threats, and the like). Different types of emergencies may be indicated by different types of visible stimuli (e.g., different colored strobe signals). This ensures that emergency signals are distinct and understandable, thereby avoiding confusion with other signals.

Typically, fire notification devices and mass notification devices are deployed using separate two-wire circuits. That is, the fire notification device is deployed on a first two-wire circuit, and the mass notification device is deployed on a second two-wire circuit.

SUMMARY OF THE INVENTION

One embodiment of a method for activating a stimulus on a notification device includes encoding an instruction to activate the stimulus in a voltage dropout pulse of a synchronization protocol and sending the synchronization protocol, including the voltage dropout pulse, over a single two wire circuit to which a fire notification device and a mass notification device are coupled, the notification device is the fire notification device or the mass notification device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one embodiment, the invention is a method and apparatus for activating and controlling fire and mass notification visual devices. In one embodiment, a fire notification device and a mass notification device are deployed using a single two-wire circuit. Information indicating whether to activate the fire notification device or the mass notification device is then encoded in the form of specifically timed voltage drop-out pulses of a synchronization protocol that is sent to the devices over the positive voltage power wire of the two-wire circuit. The synchronization protocol ensures synchronization of all fire or mass notification devices on a system (e.g., ensures that all alarm stimuli are activated at the same time for all devices). The devices are able to decode the dropout pulses and determine which devices activate their stimuli. Although the embodiments below are discussed within the context of activation of visible stimuli, it will be appreciated that the same approaches could be used to distinguish between other types of stimuli (such as audible stimuli, olfactory stimuli, or the like).

Figure 1:
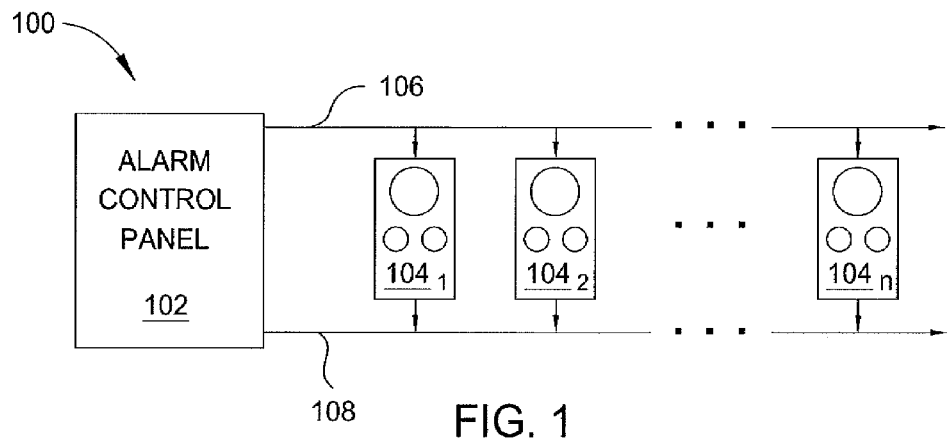
FIG. 1 is a schematic diagram illustrating one embodiment of a notification system, according to the present invention.

FIG. 1 is a schematic diagram illustrating one embodiment of a notification system 100, according to the present invention. As illustrated, the notification system comprises an alarm control panel 102 coupled to circuit comprising two wires (i.e., a positive voltage power wire 106 and a negative voltage power wire 108). A plurality of notification devices $104_1$-$104_n$, (hereinafter collectively referred to as "notification devices 104") is coupled to the two-wire circuit and receives a synchronization protocol in the form of signals over the wires 106 and 108 from the alarm control panel 102. The signals instruct the notification devices 104 as to which visible stimuli should be activated at a given times. For instance, each of the notification devices 104 may include a fire strobe (e.g., a white light strobe) and at least one mass notification strobe (e.g., an amber light strobe). Alternatively, discrete fire notification systems and mass notification systems (rather than notification devices 104 that include both fire and mass notification capabilities) can be coupled to the two-wire circuit.

Figure 2:
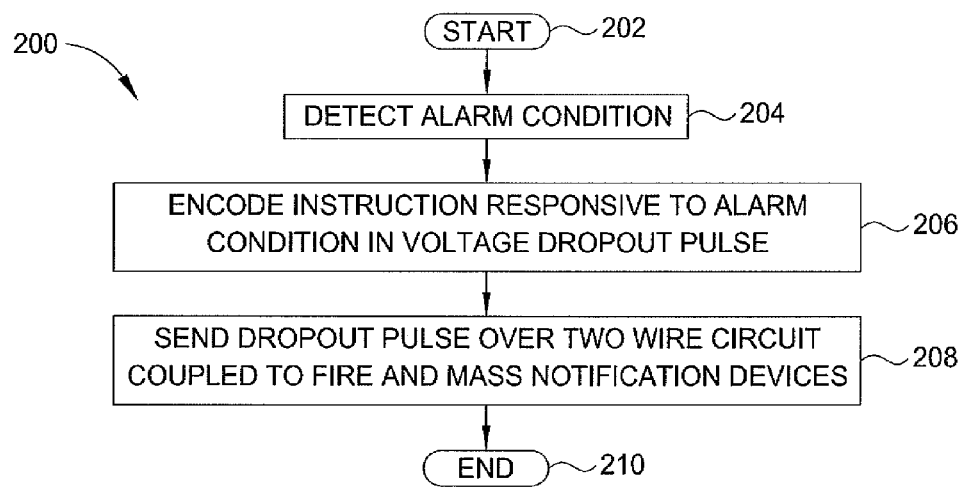
FIG. 2 is a flow diagram illustrating one embodiment of a method for activating and controlling notification devices, according to the present invention.

One embodiment of the present invention pertains to the ability to indicate to the notification devices which of the visible stimuli should be activated (e.g., fire or mass notification). FIG. 2, for example, is a flow diagram illustrating one embodiment of a method 200 for activating and controlling notification devices, according to the present invention. The method 200 may be implemented, for example, at an alarm control panel coupled to a two-wire circuit, such as the alarm control panel 102 illustrated in FIG. 1. As such, reference is made in the discussion of the method 200 to various elements of FIG. 1. It is to be understood, however, that such references are made by way of example and do not limit the method 200 to implementation with the system 100.

The method 200 is initialized at step 202 and proceeds to step 204, where the alarm control panel 102 detects an alarm condition.

In step 206, the alarm control panel 102 encodes an instruction responsive to the alarm condition in a voltage dropout pulse. The instruction instructs the notification devices 104 to activate a particular visible stimulus (e.g., if the alarm condition is a fire, the instruction instructs the notification devices 104 to activate a light strobe that indicates a fire). The voltage dropout pulse interrupts power on the positive voltage power wire for a brief period of time, thereby causing notification devices 104 coupled to the positive voltage power wire to respond in unison. Which visible stimulus (e.g., fire or mass notification) should be activated is indicated by the nature of the dropout pulse. For instance, the presence or absence of a pulse at a particular time, the time delay between particular pulses, the widths of particular pulses, or the voltage levels of particular pulses could indicate which visible stimulus should be activated. Specific embodiments of methods for encoding these instructions are described in greater detail below.

In step 208, the alarm control panel 102 sends the dropout pulse over the two wire circuit (e.g., over the positive voltage power wire) that is coupled to the notification devices 104. The method 200 then terminates in step 210.

The method 200 thereby allows multiple notification devices (e.g., a fire notification device and a mass notification device) to be controlled over a single two-wire circuit. This reduces installation costs by reducing the number of wires needed to control the notification devices by at least half (e.g., from four wires to two wires). Moreover, retrofit of existing fire-only notification systems to include mass notification is simplified, as there is no need to install an extra pair of wires. Furthermore, as illustrated in FIG. 1, the method 200 potentially allows fire and mass notification to be combined into a single device.

Figure 3:
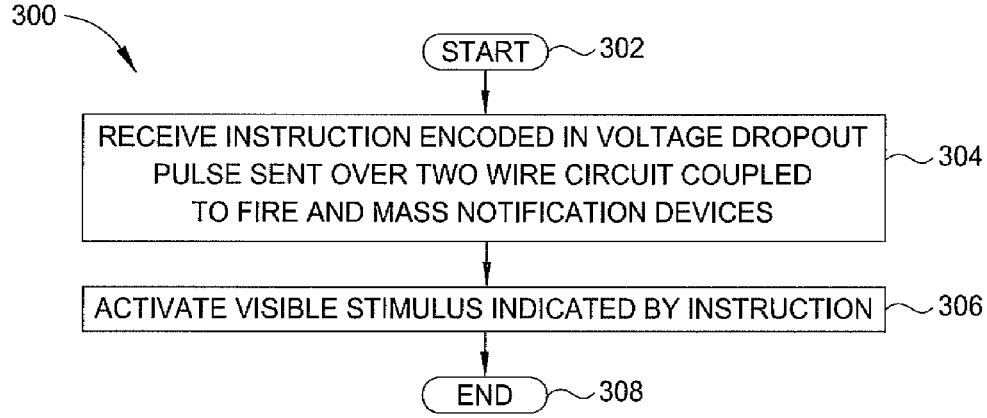
FIG. 3 is a flow diagram illustrating one embodiment of a method for activating and controlling notification devices, according to the present invention.

FIG. 3 is a flow diagram illustrating one embodiment of a method 300 for activating and controlling notification devices, according to the present invention. The method 300 may be implemented, for example, at a notification device (e.g., a fire and/or mass notification device) coupled to a two-wire circuit, such as any of the notification devices 104 illustrated in FIG. 1. As such, reference is made in the discussion of the method 300 to various elements of FIG. 1. It is to be understood, however, that such references are made by way of example and do not limit the method 300 to implementation with the system 100.

The method 300 is initialized at step 302 and proceeds to step 304, where the notification device 104 receives an instruction responsive to a detected alarm condition encoded in a voltage dropout pulse. The instruction is received over the two-wire circuit (e.g., over the positive voltage power wire) to which the notification devices 104 are coupled. The instruction directs the notification device 104 to activate a particular visible stimulus (e.g., if the alarm condition is a fire, the instruction directs the notification device 104 to activate a light strobe that indicates a fire). As discussed above, which visible stimulus (e.g., fire or mass notification) should be activated is indicated by the nature of the dropout pulse.

In step 306, the notification device activates the visible stimulus that is indicated by the encoded instruction. The method 300 then terminates in step 308.

As discussed above, instructions to activate visible stimuli are encoded in voltage dropout pulses of a synchronization protocol (e.g., as described in conjunction with step 206 of the method 200). In one embodiment, a first set of voltage dropout pulses (herein referred to as "primary pulses") is used to synchronize the light strobes or other visible stimuli on fire notification devices. The primary pulses occur periodically, at about the same rate as the flash rate for the light strobes (e.g., once per second). The light strobes detect the primary pulses and ignite their strobe flashtubes a defined amount of time after the beginning of the primary pulse (e.g., twenty milliseconds). Two additional sets of voltage dropout pulses (herein referred to as "secondary pulses") may be used to handle other functions (e.g., activation and/or silencing of audible stimuli). In one embodiment, a first secondary pulse occurs a defined period of time (e.g., two hundred milliseconds) after the primary pulse. This first secondary pulse ensures that the audible stimuli of all notification devices are on the same "beat" of a multi-beat pattern. In another embodiment, a second secondary pulse occurs every x seconds (e.g., every four seconds). The second secondary pulse instructs the notification devices to silence their audible stimuli; depending on when the second secondary pulse occurs, it indicates either silence or resound.

Figure 4:
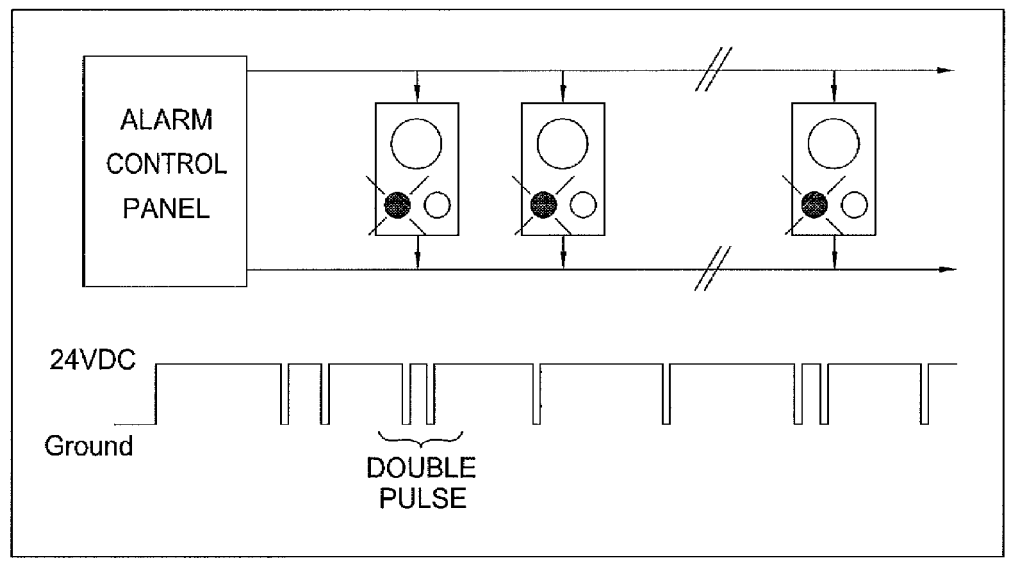
FIG. 4 is a schematic diagram illustrating a method of activating notification devices in which the presence of a silence/resound pulse activates the visible stimulus of a mass notification device.
Figure 5:
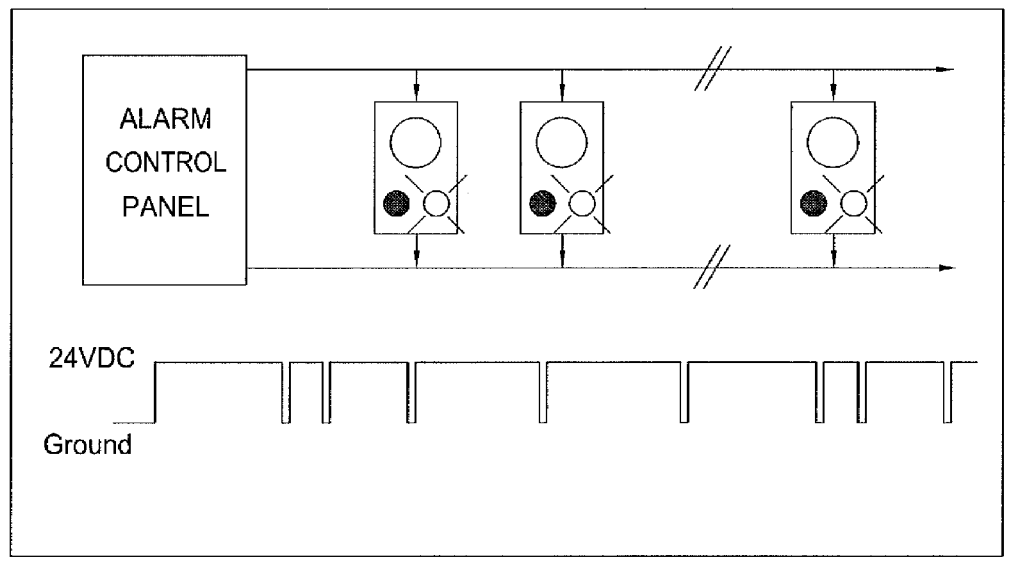
FIG. 5 is a schematic diagram illustrating a method of activating notification devices in which the absence of the silence/resound pulse activates the visible stimulus of a fire notification device.

The instruction to activate a fire or mass notification device may be encoded using a primary and/or secondary pulse in a variety of ways. In a first embodiment for example, the second secondary pulse is reassigned to indicate whether the visible stimulus for the fire notification device (e.g., white light strobe) or the mass notification device (e.g., amber light strobe) should be activated. For instance, when the second secondary pulse is a silence pulse, the instruction is to activate the visible stimulus of the fire notification device; when the second secondary pulse is a resound pulse, the instruction is to activate the visible stimulus of the mass notification device (or vice versa). FIG. 4 is a schematic diagram illustrating a method of activating notification devices in which the presence of a silence/resound pulse activates the visible stimulus of a mass notification device. As illustrated in this exemplary embodiment, a double pulse occurs at one hundred milliseconds. FIG. 5 is a schematic diagram illustrating a method of activating notification devices in which the absence of the silence/resound pulse activates the visible stimulus of a fire notification device.

Figure 6:
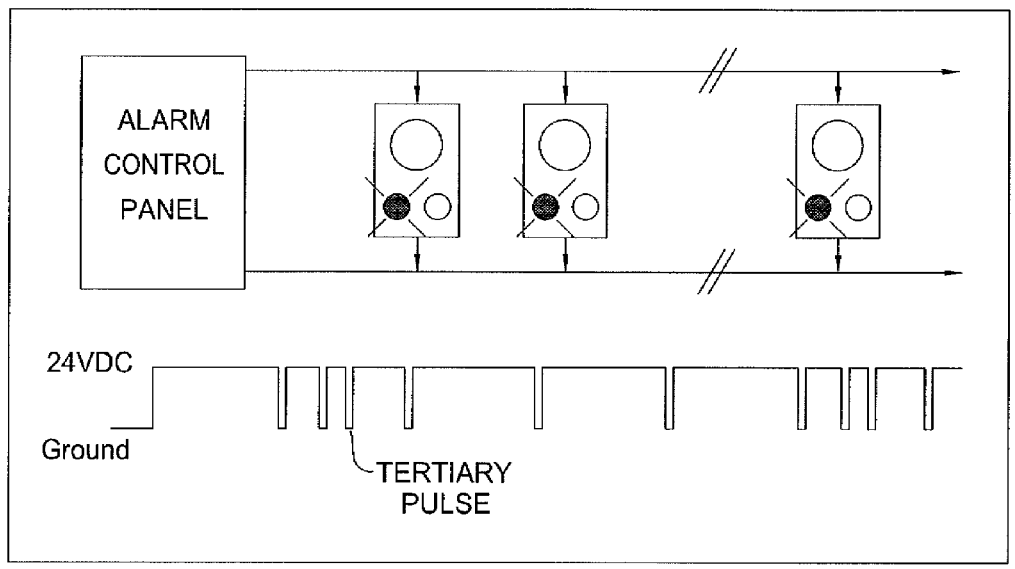
FIG. 6 is a schematic diagram illustrating a method of activating notification devices in which the presence of a tertiary pulse activates the visible stimulus of a mass notification device.
Figure 7:
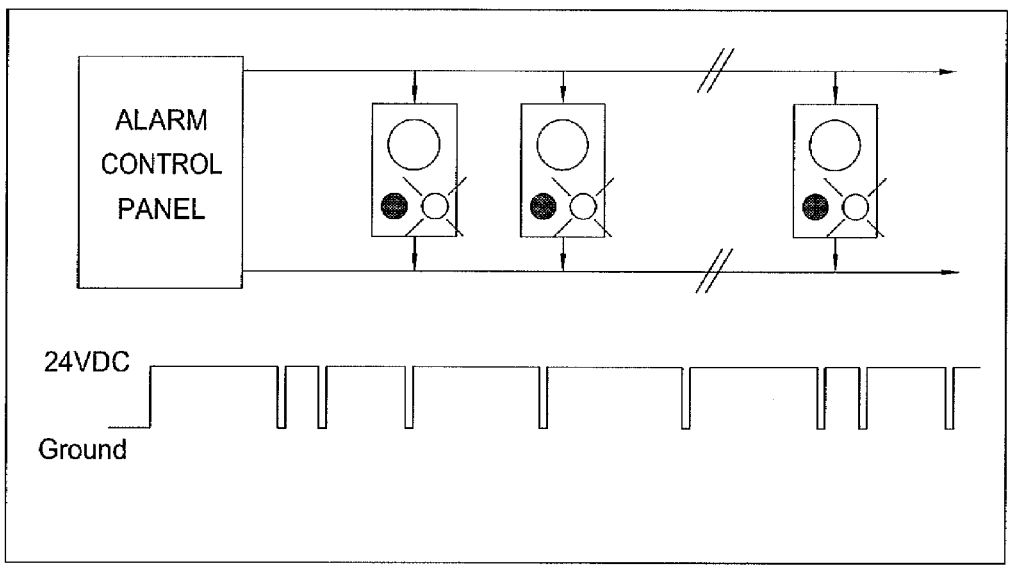
FIG. 7 is a schematic diagram illustrating a method of activating notification devices in which the absence of the tertiary pulse activates the visible stimulus of a fire notification device.

In a second embodiment, a new voltage dropout pulse (herein referred to as a "tertiary pulse") is inserted into the synchronization protocol. In one embodiment, the tertiary pulse occurs a defined period of time after one of the secondary pulses (e.g., one hundred milliseconds after the first primary pulse). For instance, when the tertiary pulse is present, the instruction is to activate the visible stimulus of the fire notification device; when the tertiary pulse is not present, the instruction is to activate the visible stimulus of the mass notification device (or vice versa). FIG. 6 is a schematic diagram illustrating a method of activating notification devices in which the presence of a tertiary pulse activates the visible stimulus of a mass notification device. FIG. 7 is a schematic diagram illustrating a method of activating notification devices in which the absence of the tertiary pulse activates the visible stimulus of a fire notification device.

In a third embodiment, the tertiary pulse described above is used to determine which specific visible stimulus in a multi-stimuli mass notification device should be activated. Specifically, the timing of the tertiary pulse indicates which specific visible stimulus should be activated. For example, a tertiary pulse occurring x milliseconds (e.g., two hundred milliseconds) after the primary pulse would indicate that a first visible stimulus (e.g., an amber light strobe) should be activated; a tertiary pulse occurring y milliseconds (e.g., three hundred milliseconds) after the primary pulse would indicate that a second visible stimulus (e.g., a blue light strobe) should be activated; a tertiary pulse occurring z milliseconds (e.g., four hundred milliseconds) after the primary pulse would indicate that a third visible stimulus (e.g., a red light strobe) should be activated; etc.

In a fourth embodiment, the width of the primary pulse is varied in order to indicate activation of the visible stimulus of the fire notification device or the mass notification device. For example, a primary pulse of x milliseconds (e.g., fifteen milliseconds) would indicate that the visible stimulus of the fire notification device should be activated; a primary pulse of y milliseconds (e.g., thirty milliseconds) would indicate that the visible stimulus of the mass notification device should be activated.

In a fifth embodiment, a new voltage level in inserted into the synchronization protocol. For instance, information may be coded in either a first voltage level (e.g., 1 or high voltage, at whatever voltage the input voltage rail is) or a second voltage level (e.g., 0 or low voltage near zero). In this embodiment, a third voltage level indicates a third logic state. The notification devices would then read the input voltage as either low (traditional voltage dropout pulses) or lower (the third voltage level). For example, a primary pulse that is near zero volts would indicate that the visible stimulus of the fire notification device should be activated; a primary pulse that is at a high voltage (e.g., six volts) would indicate that the visible stimulus of the mass notification device should be activated. Alternatively, the third voltage level could be lower than zero volts.

In a sixth embodiment, any of the first through fifth embodiments is used to distinguish between the visible stimuli of a multi-stimuli mass notification device only. That is, the fire notification devices and the mass notification devices are coupled to different two wire circuits.

Figure 8:
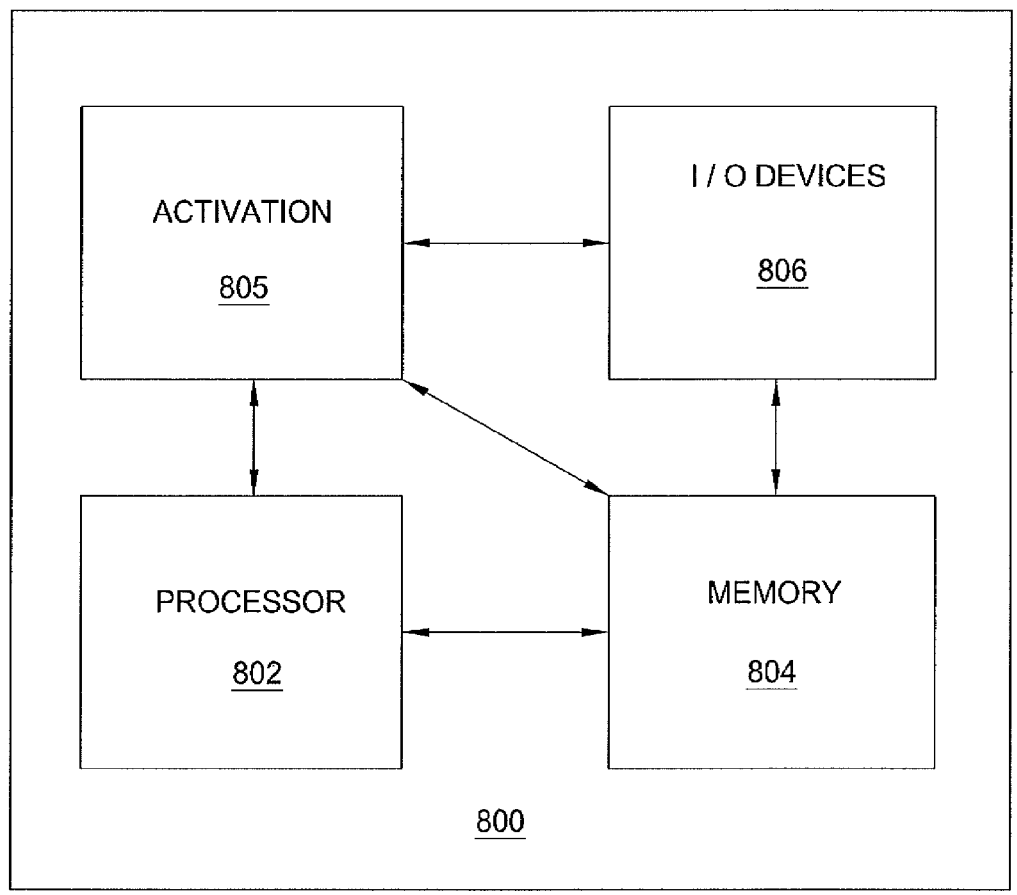
FIG. 8 is a high level block diagram of the present invention implemented using a general purpose computing device.

FIG. 8 is a high level block diagram of the present invention implemented using a general purpose computing device 800. The general purpose computing device 800 may be implemented, for example, as the alarm control panel 102 illustrated in FIG. 1. It should be understood that embodiments of the invention can be implemented as a physical device or subsystem that is coupled to a processor through a communication channel. Therefore, in one embodiment, a general purpose computing device 800 comprises a processor 802, a memory 804, a notification device activation module 805, and various input/output (I/O) devices 806 such as a display, a keyboard, a mouse, a modem, a microphone, speakers, a touch screen, a hybrid I/O device, and the like. In one embodiment, at least one I/O device is a storage device (e.g., a disk drive, an optical disk drive, a floppy disk drive).

Alternatively, embodiments of the present invention (e.g., notification device activation module 805) can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Thus, in one embodiment, the notification device activation module 805 for activating and controlling fire and mass notification devices described herein with reference to the preceding Figures can be stored on a non-transitory computer readable medium (e.g., RAM, magnetic or optical drive or diskette, and the like.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in the accompanying Figures that recite a determining operation or involve a decision, do not necessarily require that both branches of the determining operation be practiced. In other words, one of the branches of the determining operation can be deemed as an optional step. Moreover, although steps of the methods described above may be illustrated in a certain sequence, those skilled in the art will appreciate that the steps of the methods described need not necessarily occur in the order illustrated. Thus, the accompanying Figures do not illustrate a mandatory sequential order.

Although various embodiments which incorporate the teachings of the present invention have been shown and described in detail herein, those skilled in the art can readily devise many other varied embodiments that still incorporate these teachings.

What is claimed is:

1. A method for activating a stimulus on a notification device, the method comprising:
    encoding a direct instruction to activate the stimulus in a non-primary voltage dropout pulse of a single synchronization protocol, wherein the non-primary voltage dropout pulse is separate from a primary voltage dropout pulse of the single synchronization protocol in which a direct command to synchronize activation of the stimulus with other stimuli is encoded; and
    sending the single synchronization protocol, including the primary voltage dropout pulse and the non-primary voltage dropout pulse, directly from an alarm control panel over a single two-wire circuit to which a fire notification device and a mass notification device are independently coupled, wherein the fire notification device includes a first decoder for decoding the single synchronization protocol and the mass notification device includes a second decoder, independent and separate from the first decoder, for decoding the single synchronization protocol,
    wherein the notification device is the fire notification device or the mass notification device, and
    wherein the fire notification device is housed within a first housing, and the mass notification device is housed within a second housing that is physically detached from the first housing when the fire notification device and the mass notification device are connected to the alarm control panel.

2. The method of claim 1, wherein the stimulus is a visible stimulus.

3. The method of claim 2, wherein the visible stimulus is a light strobe.

4. The method of claim 3, wherein a color of the light strobe indicates a nature of an alarm condition to which the instruction is responsive.

5. The method of claim 1, wherein the encoding comprises:
    providing the non-primary voltage dropout pulse as a secondary voltage dropout pulse that indicates whether the stimulus is associated with the fire notification device or with the mass notification device.

6. The method of claim 5, wherein a type of the secondary voltage dropout pulse indicates whether the stimulus is associated with the fire notification device or with the mass notification device.

7. The method of claim 6, wherein the type of the secondary voltage dropout pulse is a silence pulse.

8. The method of claim 6, wherein the type of the secondary voltage dropout pulse is a resound pulse.

9. The method of claim 6, wherein the secondary voltage dropout pulse occurs a defined period of time after the primary voltage dropout pulse.

10. The method of claim 6, wherein the secondary voltage dropout pulse occurs every defined number of seconds.

11. The method of claim 1, wherein the encoding comprises:
    providing a secondary voltage dropout pulse of the single synchronization protocol to control a second operation; and
    providing the non-primary voltage dropout pulse as a tertiary voltage dropout pulse of the single synchronization protocol to indicate whether the stimulus is associated with the fire notification device or with the mass notification device.

12. The method of claim 11, wherein a presence or an absence of the tertiary voltage dropout pulse indicates whether the stimulus is associated with the fire notification device or with the mass notification device.

13. The method of claim 12, wherein the tertiary voltage dropout pulse occurs a defined period of time after the secondary voltage dropout pulse.

14. The method of claim 12, wherein a time delay between the primary voltage dropout pulse and the tertiary voltage dropout pulse indicates a type of the stimulus.

15. The method of claim 14, wherein the type of the stimulus is a specific color of light strobe.

16. The method of claim 1, wherein a width of the non-primary voltage dropout pulse indicates whether the stimulus is associated with the fire notification device or with the mass notification device.

17. The method of claim 1, wherein a voltage level of the non-primary voltage dropout pulse indicates whether the stimulus is associated with the fire notification device or with the mass notification device.

18. The method of claim 1, wherein the second housing is electrically detached from the first housing.

19. A computer readable storage device containing an executable program for activating a stimulus on a notification device, where the program performs steps comprising:
    encoding a direct instruction to activate the stimulus in a non-primary voltage dropout pulse of a single synchronization protocol, wherein the non-primary voltage dropout pulse is separate from a primary voltage dropout pulse of the single synchronization protocol in which a direct command to synchronize activation of the stimulus with other stimuli is encoded; and
    sending the single synchronization protocol, including the primary voltage dropout pulse and the non-primary voltage dropout pulse, directly from an alarm control panel over a single two-wire circuit to which a fire notification device and a mass notification device are independently coupled, wherein the fire notification device includes a first decoder for decoding the single synchronization protocol and the mass notification device includes a second decoder, independent and separate from the first decoder, for decoding the single synchronization protocol,
    wherein the notification device is the fire notification device or the mass notification device, and
    wherein the fire notification device is housed within a first housing, and the mass notification device is housed within a second housing that is physically detached from the first housing when the fire notification device and the mass notification device are connected to the alarm control panel.

20. A method for controlling a first operation comprising activating a stimulus on a notification device, the method comprising:
    encoding a direct instruction to activate the stimulus in a non-primary voltage dropout pulse of a single synchronization protocol, wherein the non-primary voltage dropout pulse is separate from a primary voltage dropout pulse of the single synchronization protocol in which a direct command to synchronize activation of the stimulus with other stimuli is encoded, wherein the encoding comprises:
        providing a secondary voltage dropout pulse of the single synchronization protocol to control a second operation; and
        providing the non-primary voltage dropout pulse as a tertiary voltage dropout pulse of the single synchronization protocol to indicate whether the stimulus is associated with the fire notification device or with the mass notification device, wherein a presence or an absence of the tertiary voltage dropout pulse indicates whether the stimulus is associated with the fire notification device or with the mass notification device, and wherein a time delay between the primary voltage dropout pulse and the tertiary voltage dropout pulse indicates a type of the stimulus; and
    sending the single synchronization protocol, including the primary voltage dropout pulse and the non-primary voltage dropout pulse, directly from an alarm control panel over a single two-wire circuit to which a fire notification device and a mass notification device are independently coupled, wherein the fire notification device includes a first decoder for decoding the single synchronization protocol and the mass notification device includes a second decoder, independent and separate from the first decoder, for decoding the single synchronization protocol,
    wherein the notification device is the fire notification device or the mass notification device.

* * * * *